United States Patent Office 3,147,093
Patented Sept. 1, 1964

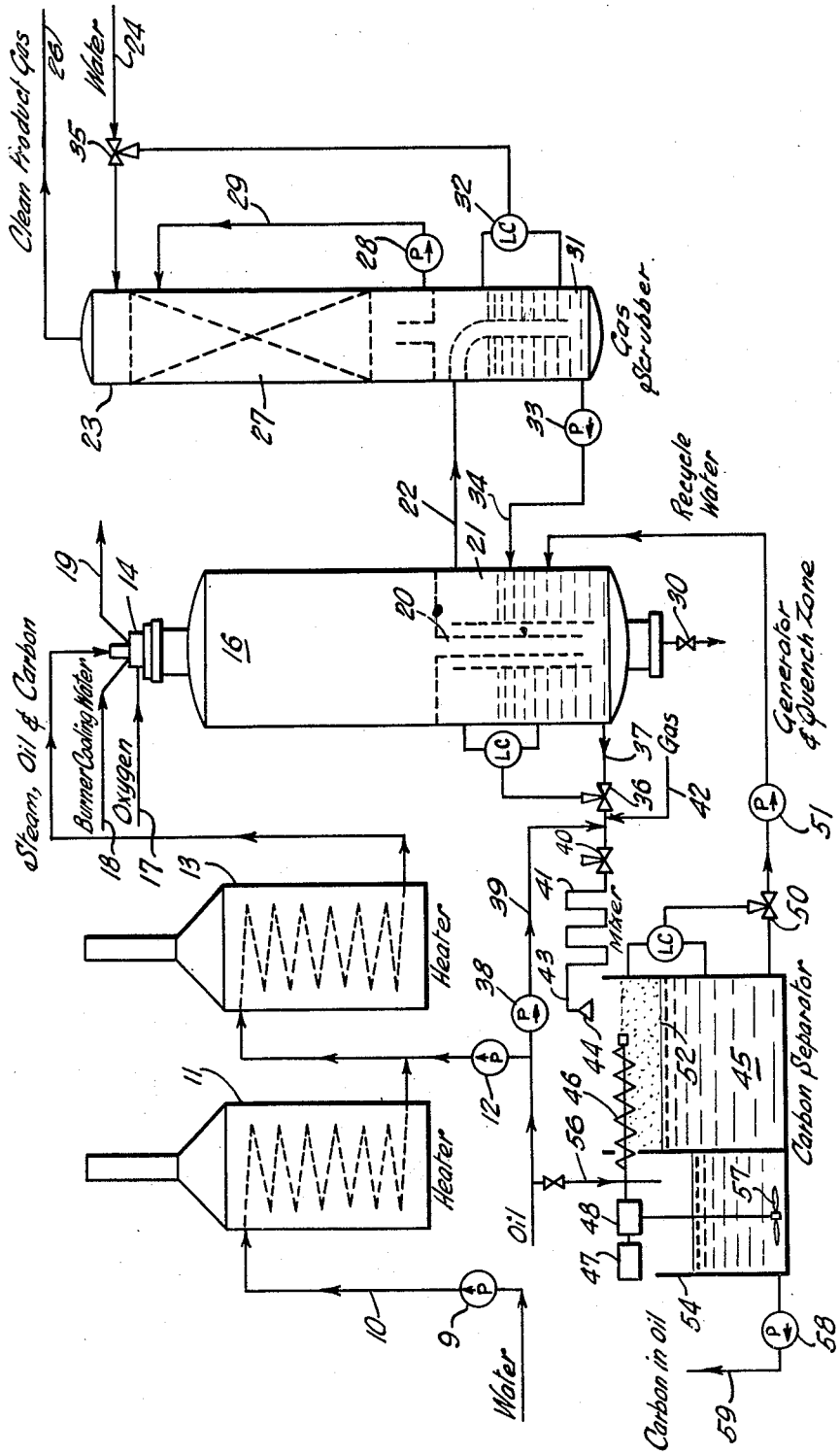

3,147,093
RECOVERY OF CARBON FROM WATER
Roger M. Dille, La Habra, Ronald W. Chapman, Whittier, and William L. Slater, La Habra, Calif., assignors to Texaco Inc., New York, N.Y., a corporation of Delaware
Filed Mar. 14, 1962, Ser. No. 179,741
6 Claims. (Cl. 48—215)

This invention relates to a process for the production of carbon monoxide and hydrogen, i.e., synthesis gas, from liquid hydrocarbons by noncatalytic reaction with oxygen and steam. In one of its more specific aspects it relates to a method for generating synthesis gas by partial oxidation of oil under carbon-forming conditions, recovering free carbon entrained in the gaseous products of reaction by scrubbing the gas with water under elevated pressure thereby forming a slurry of carbon in water, adding heavy oil to said slurry of carbon in water, optionally in the presence of added gas which is adsorbed by the carbon, reducing the pressure of the carbon in water slurry, and separating carbon containing adsorbed oil from resulting clarified water by flotation.

In accordance with the present invention, hydrocarbon oil is added to a slurry of carbon in water in an amount within the range of one-half and preferably two-thirds of the oil absorption value of the carbon contained therein to an amount equal to the oil absorption value. Such a slurry is obtained in the quench cooling and scrubbing of hot product gases from a synthesis gas generator in which hydrocarbon oil is reacted with oxygen and steam in a compact, unpacked reaction chamber to produce synthesis gas comprising carbon monoxide and hydrogen and containing minor amounts of carbon dioxide, water vapor, and free carbon. The addition of hydrocarbon oil to the water-carbon slurry in the amounts indicated above results in the formation of soft aggregates of carbon or carbon curds dispersed in water. The carbon curds, upon separation from the water, appear as small, loose agglomerates of apparently dry carbon. Analysis of the separated carbon curd shows that it contains oil. When the amount of oil added to the slurry is less than the oil absorption value of the carbon contained therein the separated carbon curds also contain water approximately equal to the difference between the oil absorption value of the carbon and the amount of oil added to the slurry. For example, if the oil absorption value of the carbon is 3 cubic centimeters per gram and the amount of oil added to the slurry abounts to 2 cubic centimeters per gram of carbon (dry) contained in the slurry, separated carbon curd contains approximately 1 cubic centimeter of water per gram of carbon.

It has been proposed heretofore, in U.S. patent application Serial No. 158,969, filed December 13, 1961, to separate carbon from quench water by the addition thereto of hydrocarbon oil in an amount within the range of two-thirds the oil absorption value of the carbon to an amount equal to the oil absorption value followed by gravity separation of carbon curd from the clarified water. In the process disclosed in said application, separation is carried out in a closed settling tank maintained under pressure. When the carbon curds are formed with heavy oil, they are heavier than water and settle to the bottom of the tank from which is withdrawn clarified water and a slurry of carbon curds in sufficient water to convey the separated carbon curds to a suitable disposal system.

In accordance with the present invention, heavy hydrocarbon oil, for example heavy fuel oil, having a specific gravity approximately equal to or higher than 1.0 is added to the slurry of carbon and water produced by scrubbing synthesis gas resulting from partial oxidation of hydrocarbon oil. The resulting carbon and oil composite or curd has a specific gravity greater than 1.0 so that the oil in carbon composite tends to sink to the bottom of the water in a gravity separation system. We have found that the carbon-heavy oil composite can be made to float to the top of the clarified water so that the curd can be removed from the water by skimming.

The apparent density of the carbon containing absorbed oil, i.e., the carbon curd, can be reduced to less than the density of the water by reducing the pressure on the slurry mixture by at least 15 pounds per square inch or by injecting gas into the slurry. In one specific embodiment of the present process, gases are added to the mixture prior to its introduction to the settling tank or within the settling tank. The carbon-oil composite rises to the surface of the water from which carbon substantially free from water may be skimmed. Clear water substantially free from oil may be drawn from the lower portion of the settling tank. It is generally desirable to maintain the settling tank, in which separation of carbon from water is carried out, at atmospheric pressure. It has been found particularly advantageous to introduce the mixture of carbon in water with which the requisite amount of heavy oil has been mixed, into a settling tank at a point higher than the uppermost level of the carbon layer floating on the clarified water layer in the tank. In this way, the incoming dispersion of carbon in water is passed through the floating layer of separated carbon, which apparently acts as a filter, facilitating the separation of the carbon complex or curd from the incoming stream. The carbon-oil composite or curd contains little water or is substantially free from water, depending upon the amount of oil added to the mixture. The carbon is readily skimmed from the top of the separating tank by suitable mechanical means, for example a rake or screw conveyor. The separated carbon can be disposed of directly or can be mixed with an additional quantity of oil and used as a fuel, for example, as fuel to preheaters or furnaces in the plant, or even recycled to the synthesis gas generator.

The generation of carbon monoxide and hydrogen, or synthesis gas, by partial oxidation of hydrocarbon oils in a flame-type reaction forms a highly economical method of producing these gases in large quantities. In the flow-type partial oxidation process, liquid hydrocarbon is reacted with oxygen and steam in a closed, compact reaction zone in the absence of packing, or at least at an autogenous temperature within the range of about 2200 to 3500° F., preferably about 2500 to 2800° F. Generally it is desirable to preheat the reactants. The hydrocarbon oil and steam are preferably preheated to a temperature of at least 600° F. Oxygen may be preheated, but this is not essential to successful operation of the process. The reaction zone generally is maintained at a pressure above 100 pounds per square inch gauge and may be maintained at a pressure as high as about 2000 pounds per square inch gauge. Steam is introduced into the reaction zone with the oil to assist in dispersion of the oil, to help control the reaction temperature, and as a reactant to increase the relative amount of hydrogen produced in the process. It is desirable to supply from about 0.5 to about 0.9 pound of steam per pound of oil to the synthesis gas generator. The product gas stream consists principally of carbon monoxide and hydrogen, together with relatively small amounts of water vapor, carbon dioxide and entrained carbon. The solid carbon produced in the process generally amounts to from about 1 to about 4 percent of the carbon contained in the fuel oil. This carbon is in very fine particle form and is easily wet with water.

Entrained carbon in the synthesis gas stream from the gas generator is effectively removed from the product gases by contacting with water in suitable gas-liquid contact apparatus, for example, spray towers, bubble plate contactors, or packed columns. Cooling of the synthesis gas may be effected also in a gas-liquid contact apparatus, for example, by injecting the hot gas from the generator directly into contact with a body of water. Cooling of the hot gas stream results in vaporization of part of the water to steam which often is useful in subsequent processing steps, for example, the water gas shift reaction to convert carbon monoxide contained in the gas stream to carbon dioxide with concomitant production of hydrogen.

It is desirable to maintain the solids content of the water in the gas-liquid contacting zone below about 1 percent carbon by weight in order to maintain the slurry, or carbon in water suspension, sufficiently fluid that it can be satisfactorily passed through pipelines for the recovery and disposition of the carbon.

Generally, the carbon-water slurry withdrawn from the quench or scrubbing section of the synthesis gas generation system is at an elevated temperature which will not exceed the equilibrium vaporization temperature of water in the presence of the product gases at the existing operating pressure. The equilibrium vaporization temperature will be somewhat below the boiling point of water at the existing pressure due to the fact that the hydrogen and carbon monoxide present in the gas scrubbing system reduces the partial pressure of the water vapor so that vaporization of water occurs at a correspondingly lowered temperature. If the steam available from the heat contained in the hot synthesis gas is desirable for a subsequent water gas shift reaction, it is desirable to contact the hot gases from the generator directly with quench cooling water and to operate the subsequent gas scrubbing operations at a temperature as near the equilibrium vaporization temperature as possible. It is possible, however, to maintain a substantial temperature differential in the gas scrubbing zone by introducing a cool scrubbing water to the top of the gas scrubber so that the gas discharged from the top of the scrubber is at a relatively low temperature and has a correspondingly low water vapor content. It is also possible to recover heat from the hot synthesis gas in the form of low pressure steam by means of a suitable waste heat boiler. In most operations, steam is needed for a subsequent water gas shift reaction so that direct water quenching is more advantageous than the use of the waste heat boiler.

It is generally desirable to conduct the gas scrubbing operations at high pressure, or substantially the pressure of the synthesis gas generator (with due allowance for pressure drop due to the resistance to gas flow through the transfer lines and quench apparatus). The use of high pressures makes possible relatively high temperatures in the scrubbing zone. The product gas can be supplied to subsequent process steps, for example, the synthesis of ammonia from hydrogen and nitrogen, at high pressure and with a high content of water vapor so that minimum compression is necessary.

In accordance with the process of this invention, the carbon-water mixture from the gas cooling and scrubbing operations is contacted with a limited quantity of oil, preferably heavy fuel oil supplied to the synthesis gas generator. Heavy fuel oil suitable for use in the process includes, for example, heavy distillates, crude residua, residual fuel oils, bunker fuel oil and No. 6 fuel oil. The fuel oil is heated to a temperature approximately equal to or higher than the temperature of the water in the gas quench zone or gas scrubbing zone at the point of withdrawal of the carbon-water mixture. It is generally desirable to withdraw the carbon-water slurry at that point in the gas cooling and scrubbing system where the carbon concentration is highest, generally from the point in the system where the hot gas from the generator first contacts the water, for example in the quench section of the gas-liquid contacting apparatus. The amount of oil added to the carbon in water slurry is within the range of about 0.5 to 1.0 times the oil absorption value of the carbon contained in the slurry. Generally the amount of oil added should be at least two-thirds the oil absorption value of the carbon. Usually it is not desirable to add more oil than that amount equivalent to the oil absorption value of the carbon, since excess oil tends to contaminate the clarified water and this is undesirable in most plant locations.

Oil absorption value is a measure of the amount of oil necessary to wet a sample of the carbon. The oil absorption value is determined by adding small increments of oil to a sample of the carbon and mixing with a spatula between each addition of oil until a single coherent ball of paste is formed which does not break down after forming. The procedure for this test is described in detail in ASTM Test D281-31. The standard test specifies alkali refined linseed oil, but the test is of value when used with other oils as well. As employed here, the oil absorption value is determined using the particular oil employed for the resolution of the carbon-water slurry into clarified water and carbon. The numerical oil absorption value represents the number of cubic centimeters of oil added per gram of carbon. Oil absorption value may be expressed in cubic centimeters per gram or may be converted to gallons per hundred pounds by applying a factor of 12. Thus an oil absorption value of 3 cubic centimeters per gram is equivalent to 36 gallons per hundred pounds of dry carbon.

Typically, the carbon produced in the synthesis gas generator has an oil absorption value of about 3 cubic centimeters per gram or about 36 gallons per hundred pounds of dry carbon. The oil absorption value may vary somewhat within the range of 2 to 4 cubic centimeters per gram.

It has been proposed heretofore, in U.S. Patent 3,016,986, to separate carbon from a carbon in water slurry by the addition of heavy oil having a gravity of about 10° API or lower in which the amount of heavy oil employed is within the range of one and one half to 20 times the oil absorption value of the carbon in the slurry. The resulting carbon and oil mixture has a density greater than water so that the composite settles to the bottom in a settling tank and clarified water may be decanted from the upper part of the tank.

Carbon from the partial oxidation process typically has an apparent density in oil of about 1.8 grams per cubic centimeter. Heavy oils, for example cracked residua, crude residua, and bunker fuel oils having gravities less than 12° API, when mixed with carbon from the partial oxidation process, result in a mixture having a density greater than water. Oil-carbon agglomerates having apparent densities greater than water also may be formed with oils having densities lower than water, that is, with oils having API gravities within the range of 10 to 20° when the amount of oil in the mixture is insufficient to counterbalance the greater density of the carbon.

In carrying out the present process, contact of the liquid hydrocarbon with the slurry of carbon in water may be effected with a mixing valve, pump, orifice, nozzle, propeller mixer, or turbine mixer. A preferred mixing arrangement consists of a series of 90° pipe elbows connected with short pieces of pipe, six inches to one foot in length, to form an arrangement of piping resembling the shape of an automobile crankshaft. A mixer of this type is illustrated diagrammatically in the drawing. It is preferable to contact the carbon in water slurry with the oil at the temperature and pressure of the gas-liquid contacting zone from which the slurry is withdrawn. It is undesirable, however, to inject the oil directly into the gas-liquid contacting zone as this may result in the separation of carbon from the water within the contacting zone. Accordingly, therefore, it is preferred to inject the oil in a measured quantity directly into the stream of carbon in water immediately following the withdrawal of the slurry from the gas-liquid contacting system and at substantially the pressure of said system and thereafter to pass the resulting mixture through a mixing zone to insure intimate contact between the added oil and the carbon dispersed in the carbon in water slurry. After mixing, the mixture is passed to a settling tank, suitably maintained at atmospheric pressure. Pressure reduction and elevated temperature apparently facilitate phase separation by expansion of gases adsorbed on the carbon so that the apparent density of the carbon-oil composite or curd is considerably less than the density of the hot water in the separation zone. The carbon-oil composite readily floats above the water and can be skimmed off. A very short period of time, less than 2 minutes, is required for separation of the carbon-oil composite from the clarified water. Clarified water from the phase separator or settling tank may be returned to the scrubbing zone or reused elsewhere in the process.

Having set forth the general nature of the invention, a preferred method of operation is described and illustrated in the accompanying drawing and in the following detailed description of the drawing. Although the drawing illustrates a suitable arrangement of apparatus by which the process of this invention may be carried out, it is to be understood that the process of the invention is not limited to the particular apparatus or procedure described in detail hereinafter.

With reference to the drawing, water is passed by pump 9 through line 10 to a tubular heater 11 wherein it is vaporized to steam. Fuel oil for the production of synthesis gas, supplied from a suitable source, is injected by pump 12 into the stream of steam produced in heater 11, and the resulting mixture passed through tubular heater 13 wherein the mixture of steam and oil is further heated and the oil intimately dispersed in fine droplet form in the steam. The resulting dispersion, preheated to the desired extent, preferably 600 to 800° F., is passed directly into burner 14 through which it is introduced into synthesis gas generator 16. Intimate dispersion of the fuel oil in fine particle form in the steam is accomplished by passing the steam-oil mixture through tubular heater 13 and associated piping to the burner at a velocity above about 30 feet per second. Oxygen from line 17 is supplied to burner 14 of the synthesis gas generator where it is intimately mixed with the dispersion of oil in steam supplied to the burner from heater 13. The oxygen may be supplied without preheat or preheated to a temperature of about 600° F. Ordinarily it is sufficient to employ oxygen at a temperature of 200 to 300° F., the temperature developed on compression of the oxygen from near atmospheric pressure to the pressure of the synthesis gas generator. Cooling water is supplied to the burner through line 18 and discharged through line 19 to prevent overheating of the burner.

The synthesis gas generator preferably is operated at an elevated pressure above 100 pounds per square inch gauge and desirably at a pressure of 400 pounds per square inch gauge or higher. The steam, oil and oxygen react in the gas generator 16 at an autogenous temperature above 2200° F., for example, at a preferred temperature of about 2800° F. and at elevated pressure, for example, 300 pounds per square inch gauge, to produce synthesis gas comprising carbon monoxide and hydrogen. The hot synthesis gas so produced also contains entrained carbon in the range of 0.5 to 5 percent, preferably about 2 percent, of the carbon content of the oil supplied to the burner of the gas generator.

Hot synthesis gas from gas generator 16 is discharged through dip tube 20 into quench chamber 21 into direct intimate contact with water contained therein. A preferred form of the quench apparatus is described in U.S. Patent 2,896,927. Water in the quench zone effects quick cooling of the hot gas from the generator, removal of a large proportion of the entrained carbon from the freshly generated synthesis gas, and production of substantial amounts of steam useful in subsequent operations, for example, the water gas shift reaction. The cooled synthesis gas is passed through line 22 to scrubber 23 where it is further contacted and scrubbed in countercurrent flow with water introduced to the upper part of the scrubber through line 24. Synthesis gas, free from entrained carbon, is discharged from the scrubber through line 26 at substantially the pressure of the gas generator.

The scrubber 23 preferably is provided with a packed section 27 to insure intimate countercurrent gas-liquid contact. A stream of wash water is recycled over the packing by means of pump 28 and line 29. The wash liquid containing carbon removed from the gas stream accumulates in the lower portion of accumulator section 31 of the gas scrubbing tower. Excess wash liquid from the gas scrubber is passed by pump 33 through line 34 to quench section 21 of the synthesis gas generator. The level of the liquid in the accumulator section of the gas scrubber may be controlled by liquid level controller 32 and valve 35 which regulates the rate of introduction of water to the gas scrubber.

Accumulations of heavy solid material in quench zone 21 may be periodically withdrawn through valve 30 from the lowermost portion of the quench zone. Preferably a lock hopper, not illustrated in the drawing, is employed to effect removal of solids with sufficient water for conveying the solids from gas quench zone 21.

A slurry of carbon in water is withdrawn from quench section 21 through line 37. Fuel oil is injected by pump 38 through line 39 into the carbon-water slurry in line 37. The amount of oil introduced at this point is preferably in the range of from about 0.67 to 1.0 times the oil absorption value of the carbon contained in quench water, preferably about equal to the oil absorption value. In most cases, the oil absorption value of the carbon will be about 3 cubic centimeters per gram so that the amount of fuel oil supplied through line 39 will amount to about 36 gallons per hundred pounds of carbon (dry basis) contained in the carbon-water slurry withdrawn from the gas-liquid contact zone 21 through line 37. The rate of withdrawal of the slurry is controlled by liquid level control valve 36. Thorough mixing of the fuel oil with the slurry of carbon in water is accomplished by passing the fuel oil and slurry through back pressure regulator valve 40 and mixer 41. In this example, mixer 41 comprises a number of 90° pipe elbows connected with relatively short pieces of pipe, ranging from about 6 inches to about 3 feet in length, to form a series of connected hairpin loops shaped like an automobile crankshaft, which insure intimate admixture between the oil and the water containing suspended carbon. Pressure reduction across the valve 40 and the mixer amounts to 200–250 p.s.i., ensuring intimate mixing of the oil and slurry.

Gas, for example, nitrogen, methane, air or synthesis gas produced in the process may be brought into contact with the oil and carbon in water dispersion prior to or during the mixing of the oil with the dispersion to further decrease the apparent density of the carbon wet with oil and speed its separation from the water. Gas from a suitable source may be added to the mixture of oil and slurry through line 42.

From mixer 41, the resulting mixture comprising water and carbon containing absorbed oil is discharged through line 43, suitably through a distributor 44 into settling tank or carbon separator 45. The mixture of carbon, water and oil preferably is introduced into separator 45 at a point above the upper level of the mixture in the separator. In carbon separator 45, carbon containing absorbed oil floats to the top of the separator tank and is removed therefrom by screw conveyor 46 driven by motor 47 and suitable drive means 48. Clarified water is withdrawn from the bottom of the carbon separator and pumped by pump 51 back into the quench zone 21 of the synthesis gas generator at a rate such that the level of the water layer is maintained below the level of the screw conveyor. A screen 52 may be provided in the carbon separator tank to facilitate separation of the carbon from the clarified water. The water level in carbon separator 45 preferably is maintained at or near the level of the screen by level control valve 50. It should be understood that the screen is not necessary for successful operation of the carbon separator.

Carbon containing absorbed oil is withdrawn from separator 45 by means of screw conveyor 46 and is discharged into mixing tank 54 where it is mixed with fuel oil introduced to the mixing tank through line 56. A suitable mixer, for example a propeller mixer 57 driven by motor 47 through drive means 48, in tank 54 provides intimate mixing of the carbon with oil to form a slurry of carbon in oil suitable for use as fuel. The resulting carbon in oil slurry is withdrawn by pump 58 and discharged through line 59 for use as fuel.

Synthesis gas is produced by partial oxidation of a bunker fuel oil at a temperature of 2400° F. and 340 pounds per square inch gauge. The bunker fuel oil has a gravity of 11° API and a Saybolt Furol viscosity of 185 seconds at 122° F. In the generation of the synthesis gas, about 4-5 percent of the carbon contained in the fuel oil is not converted to gaseous products but appears as entrained carbon in the product gas stream. The entrained carbon has an oil absorption value of 3 cubic centimeters per gram (36 gallons per hundred pounds). The hot synthesis gas is cooled to about 380° F. by direct water quench. Water containing about 0.5 weight percent carbon is withdrawn from the quench section of the synthesis gas generator at a pressure of 340 p.s.i.g. and a temperature of 380° F. and cooled in a heat exchanger to 140° F. Bunker fuel oil is injected into the stream of quench water withdrawn from the quench section of the gas generator at the rate of 36 gallons of oil per 100 pounds of carbon (dry weight) contained in the quench water slurry. In this example, the amount of oil added amounts to approximately 1.5 gallons of oil per 100 gallons of quench water slurry. The bunker fuel oil is preheated to 180° F. prior to injection into the quench water. The mixture passes through a back pressure regulator valve and then through a mixer comprising 49 three quarter inch pipe elbows connected by short lengths of pipe to provide highly turbulent flow and intimate mixing of the oil with the water-carbon slurry. The pressure drop across the regulator valve and mixer is 200-250 p.s.i. The resulting mixture is discharged into a settling tank maintained at atmospheric pressure, the mixture entering the tank above the uppermost level of the carbon in the settling tank. A layer of dry-appearing carbon accumulates on the water in the separator. Clear water containing only a trace of oil is withdrawn from the bottom of the separator and recycled to the quench section of the synthesis gas generator. Carbon containing absorbed oil floats on the water and is removed from the upper part of the settling tank. The carbon separated from the water also contains a small amount (about 20 percent by weight) of water. Carbon separated from the quench water was squeezed by passing it through rubber rollers. Approximately half the water associated with the carbon was eliminated in this manner.

Bunker fuel oil is added to the separated carbon to form a slurry of carbon in fuel oil which is supplied to the burners of the steam generating feed preheaters for the synthesis gas generator.

In a series of tests, the mixture of oil and carbon in water slurry from the mixer described above was passed over a series of screens ranging from 4 to 14 meshes per lineal inch. Excellent separation between carbon and water was obtained in each instance.

We claim:
1. The method for recovering from an aqueous dispersion carbon produced in the partial oxidation of a hydrocarbon to synthesis gas which comprises contacting a dispersion of said carbon in water under elevated pressure above 100 p.s.i.g. with a heavy hydrocarbon liquid having an API gravity less than 12° in an amount within the range of 0.5 to 1.0 times the oil absorption value of the carbon contained in said dispersion, admixing said oil with said dispersion at said elevated pressure to form a carbon-oil composite comprising oil absorbed by said carbon, reducing the pressure of said mixture by at least 15 p.s.i., separating clarified water substantially free from carbon from the resulting mixture by gravity separation, and skimming carbon from the surface of said clarified water.

2. A process according to claim 1 wherein said clarified water separated from said dispersion is recirculated to said gas-liquid contacting zone.

3. A process according to claim 1 wherein said heavy hydrocarbon liquid is heated to a temperature at least as high as the temperature of said dispersion of carbon in water prior to contacting with said dispersion.

4. A process according to claim 1 wherein mixing of said heavy hydrocarbon liquid with said carbon in water dispersion is accomplished by passing said oil and said wash water slurry through a tortuous tubular passageway.

5. A process according to claim 1 wherein a gas selected from the group consisting of nitrogen, methane, air and synthesis gas produced in the process is injected into said dispersion under elevated pressure prior to contact with said dispersion whereby the apparent density of the carbon is decreased and the buoyancy of the hydrocarbon-wet carbon is increased.

6. A method for recovering carbon from a product gas stream comprising carbon monoxide, hydrogen, and entrained carbonaceous solid resulting from the reaction of hydrocarbon oil with oxygen and steam, said carbon having an oil absorption value within the range of about 24 to 48 gallons per hundred pounds of dry carbon which comprise contacting said product gas stream with water in a gas-liquid contacting zone at an elevated pressure above 100 p.s.i.g. effecting removal of entrained carbon from said gas stream and forming a dispersion of carbon in water, contacting said dispersion with a heavy hydrocarbon oil at said elevated pressure having a gravity not more than 10° API in an amount within the range of two thirds of the oil absorption value to an amount equal to the oil absorption value of the carbon in a mixing zone, forming an oil-carbon mixture having an absolute density greater than water and apparent density less than water, reducing the pressure of said mixture to substantially atmospheric pressure, effecting resolution of said dispersion by gravity separation into clarified water and carbon containing absorbed oil floating on said clarified water, removing said carbon from said water, and recovering said clarified water.

References Cited in the file of this patent
UNITED STATES PATENTS

| | | |
|---|---|---|
| Re. 22,454 | Wiegand et al. | Mar. 7, 1944 |
| 2,665,980 | Carkeek | Jan. 12, 1954 |
| 2,867,508 | Wood et al. | Jan. 6, 1959 |
| 2,987,386 | Chapman et al. | June 6, 1961 |
| 2,992,906 | Guptill | July 18, 1961 |
| 2,999,741 | Dille et al. | Sept. 12, 1961 |
| 3,016,986 | Dille et al. | Jan. 16, 1962 |
| 3,042,504 | Carter | July 3, 1962 |
| 3,044,179 | Chapman et al. | July 17, 1962 |